United States Patent
Park et al.

(10) Patent No.: US 12,378,638 B2
(45) Date of Patent: Aug. 5, 2025

(54) METHOD FOR RECOVERING LITHIUM FROM BRINE

(71) Applicant: Korea Institute Of Geoscience And Mineral Resources, Daejeon (KR)

(72) Inventors: In Su Park, Gyeryong-si (KR);
Hye-Jin Hong, Daejeon (KR);
Chang-Youl Suh, Daejeon (KR);
Sukjoon Park, Cheongju-si (KR);
Myunggyu Lee, Namyangju-si (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 749 days.

(21) Appl. No.: 17/773,253

(22) PCT Filed: May 29, 2020

(86) PCT No.: PCT/KR2020/007000
§ 371 (c)(1),
(2) Date: Apr. 29, 2022

(87) PCT Pub. No.: WO2021/085777
PCT Pub. Date: May 6, 2021

(65) Prior Publication Data
US 2022/0364203 A1 Nov. 17, 2022

(30) Foreign Application Priority Data
Nov. 1, 2019 (KR) .................. 10-2019-0138795

(51) Int. Cl.
*C22B 26/12* (2006.01)
*C01D 15/06* (2006.01)
(Continued)

(52) U.S. Cl.
CPC ............ *C22B 26/12* (2013.01); *C01D 15/06* (2013.01); *C01F 7/14* (2013.01); *C02F 1/5236* (2013.01);
(Continued)

(58) Field of Classification Search
CPC .......... C22B 26/12; C22B 3/08; C01D 15/06; C01F 7/14; C02F 2103/08
See application file for complete search history.

(56) References Cited

U.S. PATENT DOCUMENTS

| 10,144,990 B2 | 12/2018 | Bourassa et al. |
| 2016/0265085 A1 | 9/2016 | Bourassa et al. |
| 2019/0345582 A1 | 11/2019 | Bourassa et al. |

FOREIGN PATENT DOCUMENTS

| CN | 103553087 A | * | 2/2014 |
| JP | 6559754 B2 | | 8/2019 |

(Continued)

OTHER PUBLICATIONS

International Search Report for International Application No. PCT/KR2020/007000 dated Sep. 3, 2020.

*Primary Examiner* — Anthony J Zimmer
*Assistant Examiner* — Annette Phan
(74) *Attorney, Agent, or Firm* — Harness, Dickey & Pierce, P.L.C.

(57) ABSTRACT

The present invention relates to a method for recovering lithium from brine, and provides a method for recovering lithium from brine, the method comprising: (a) an impurity removal step of adding a carbonate supply source to brine including lithium, magnesium and calcium to precipitate and remove magnesium and calcium impurities; (b) a pH adjusting step of adding an acid to the brine from which the impurities have been removed, to adjust the pH of the brine; (c) a lithium-aluminum compound recovery step of adding an aluminum supply source to the pH-adjusted brine to (Continued)

recover a lithium-aluminum compound; (d) a lithium sulfate and aluminum oxide formation step of adding the lithium-aluminum compound to a sulfur supply source and calcining same to form lithium sulfate and aluminum oxide; and (e) a lithium sulfate solution yield step of selectively dissolving lithium sulfate from among the formed lithium sulfate and aluminum oxide to yield a lithium sulfate solution.

15 Claims, 4 Drawing Sheets

(51) Int. Cl.
*C01F 7/14* (2022.01)
*C02F 1/52* (2023.01)
*C22B 3/08* (2006.01)
*C22B 3/22* (2006.01)
*C22B 3/44* (2006.01)
*C02F 103/08* (2006.01)

(52) U.S. Cl.
CPC .................. *C22B 3/08* (2013.01); *C22B 3/22* (2013.01); *C22B 3/44* (2013.01); *C02F 2103/08* (2013.01)

(56) References Cited

FOREIGN PATENT DOCUMENTS

| KR | 10-2012-0014828 A | 2/2012 |
| KR | 10-2012-0060619 A | 6/2012 |
| KR | 10-2012-0063069 A | 6/2012 |
| KR | 10-2014-0144381 A | 12/2014 |
| KR | 101944518 B1 | 2/2019 |
| KR | 101944519 B1 | 2/2019 |
| KR | 102059858 B1 | 12/2019 |

* cited by examiner

[FIG. 1]
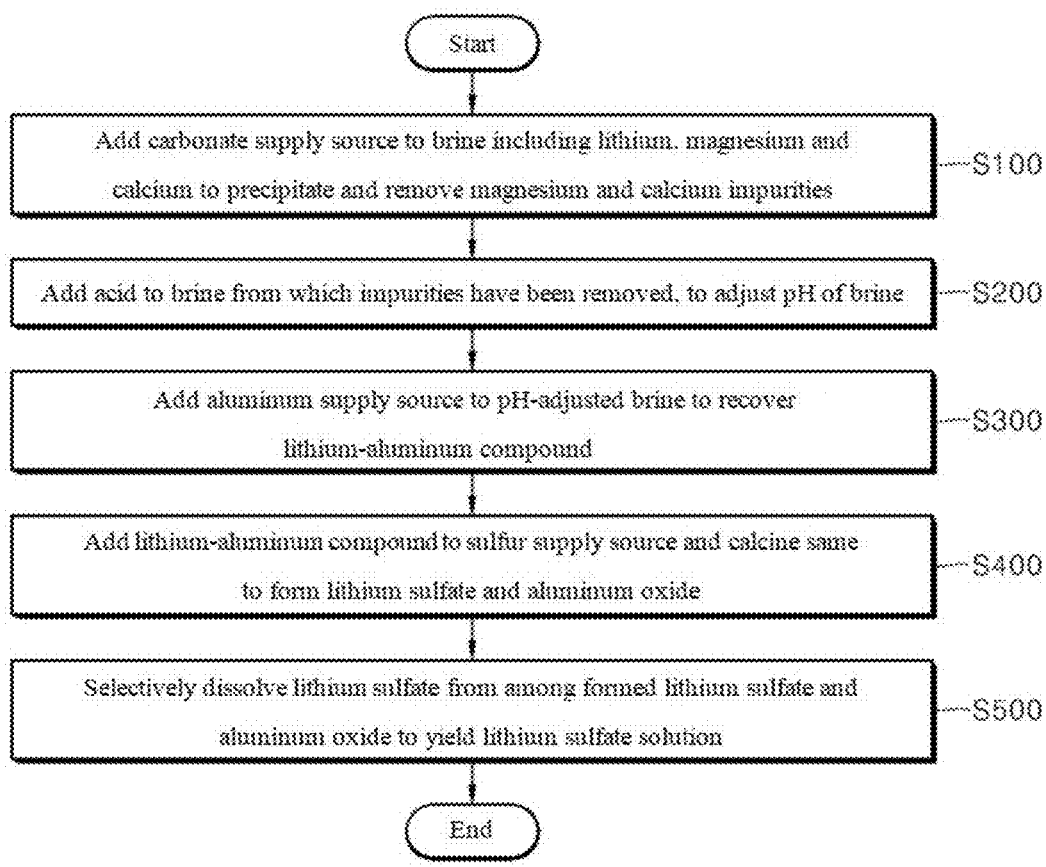

[FIG. 2]
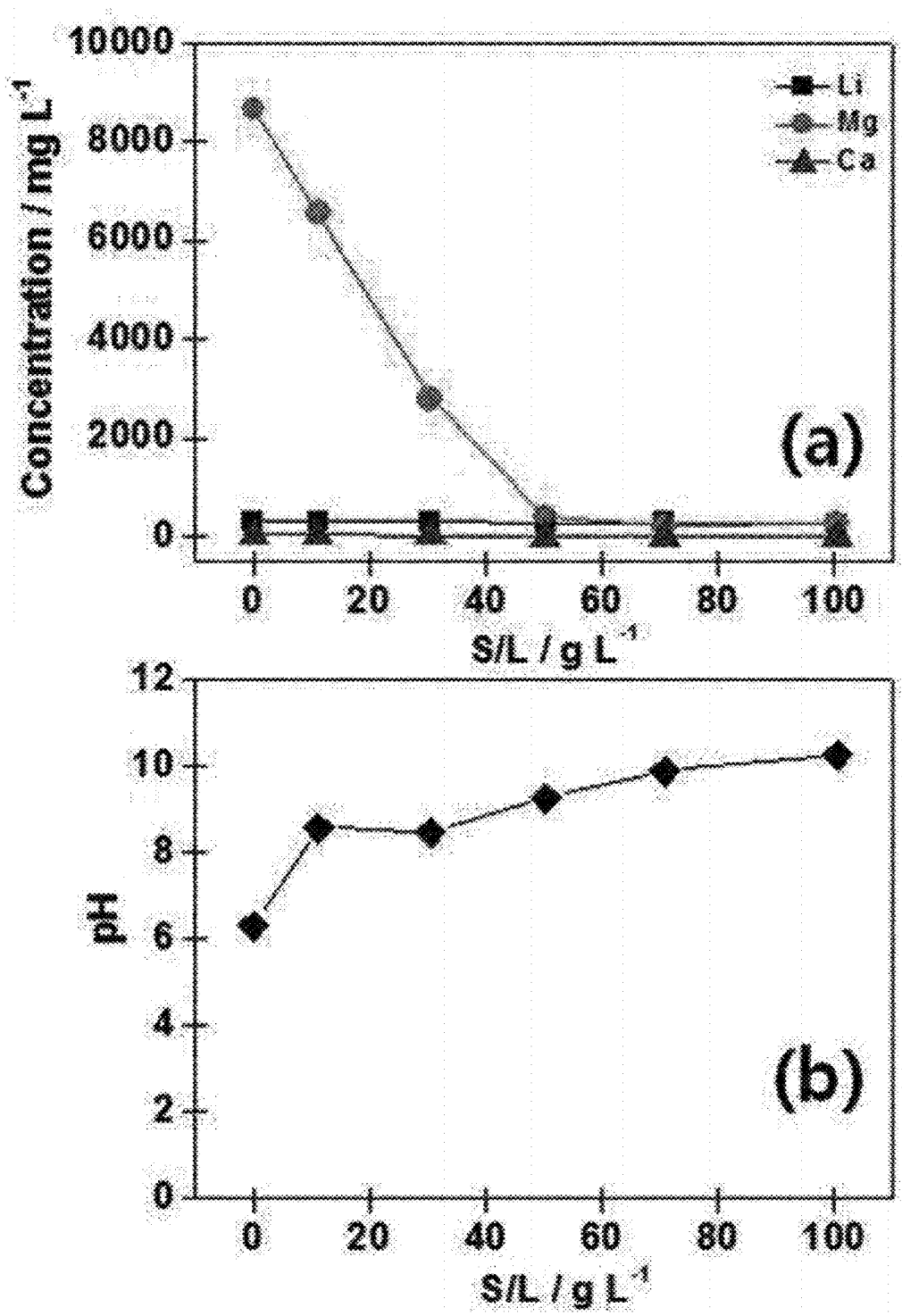

[FIG. 3]
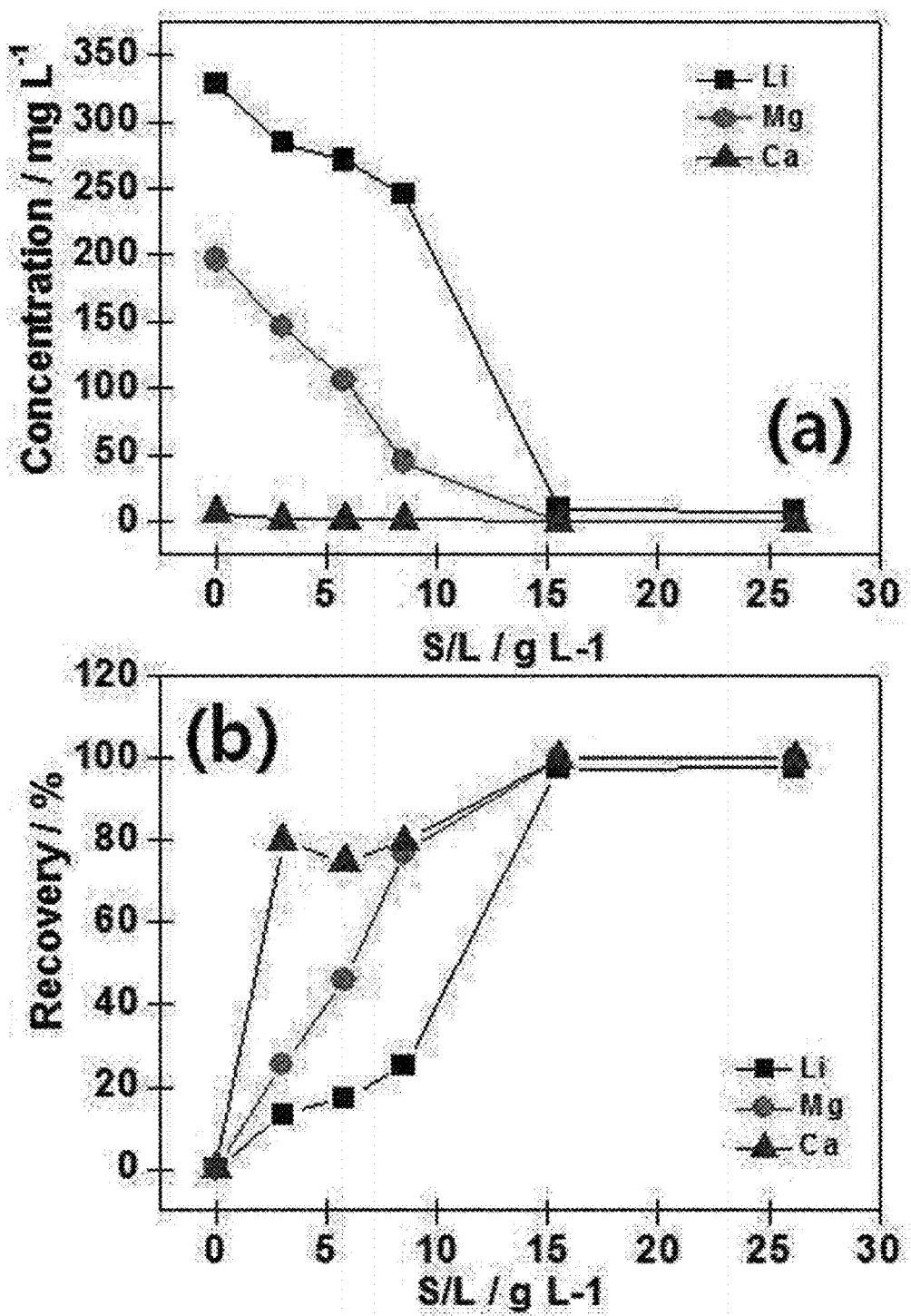

[FIG. 4]
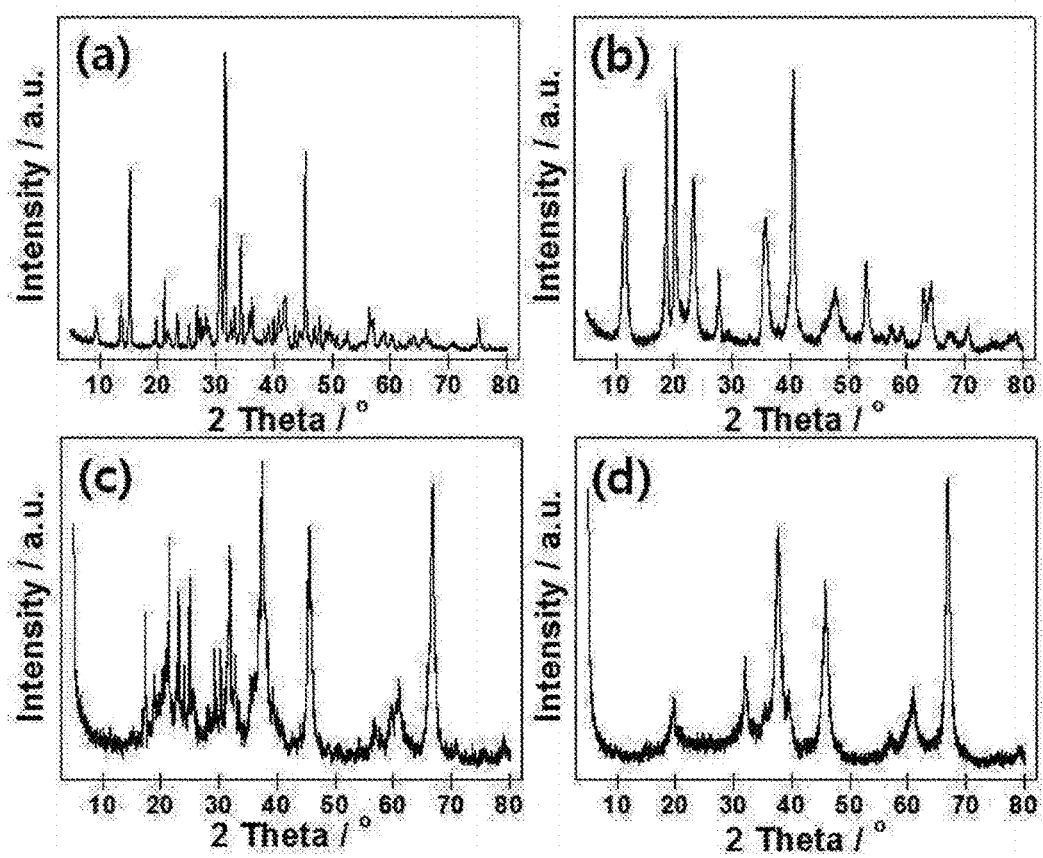

METHOD FOR RECOVERING LITHIUM FROM BRINE

CROSS-REFERENCE TO RELATED APPLICATIONS

This application is a national phase under 35 U.S.C. § 371 of PCT International Application No. PCT/KR2020/007000 which has an International filing date of May 29, 2020, which claims priority to Korean Application No. 10-2019-0138795, filed Nov. 1, 2019, the entire contents of each of which are hereby incorporated by reference.

TECHNICAL FIELD

The present invention relates to a method for recovering lithium from brine, and more particularly, to a method for recovering lithium sulfate from lithium brine including magnesium and calcium.

BACKGROUND ART

Lithium has been widely used in various industries such as secondary batteries, glass, ceramics, alloys, lubricants, and pharmaceuticals. In particular, lithium secondary batteries are recently attracting attention as a major power source for hybrid and electric vehicles, and the existing small battery market such as mobile phones and laptops has been also expected to grow into a huge market of 100 times larger in the future.

In addition, due to the global movement to strengthen environmental regulations, in the near future, not only hybrid and electric vehicle industries, but also its application fields will be greatly expanded to electronics, chemistry, energy, etc., and as a result, it is expected that domestic and foreign demand for lithium will surge throughout the 21st century industry.

Sources of such lithium include minerals, brine, sea water, etc. Among them, the minerals include spodumene, petalite, lepidolite, and the like, and contain a relatively large amount of lithium at about 1 to 1.5%. However, in order to extract lithium from minerals, since it is necessary to perform processes such as flotation, high-temperature heating, pulverization, acid mixing, extraction, purification, concentration, and precipitation, there is a problem in that the recovery procedure is complicated and a large of cost is required due to high energy consumption.

In addition, it is known that a total of $2.5 \times 10^{11}$ tons of lithium is dissolved in seawater, and a technology of adding a recovery device containing an adsorbent into the seawater to selectively adsorb lithium, and then extracting lithium by acid treatment is dominated.

However, since the concentration of lithium contained in the seawater is only 0.17 ppm, it is very inefficient to extract lithium from the seawater, and as a result, there is a problem in that economical efficiency is lowered.

Due to these problems, currently, lithium has been mainly extracted from brine, but the brine is produced in a natural salt lake, and dissolved with salts such as magnesium, calcium, boron, sodium, potassium, sulfuric acid, etc. including lithium, and thus in order to obtain a high-purity lithium compound, it is required to separate impurities such as magnesium, calcium, etc.

In order to separate the impurities from the brine, in the related art, alkali such as sodium hydroxide (NaOH) is added to the brine to precipitate and remove magnesium and calcium contained in the brine into magnesium hydroxide and calcium hydroxide, respectively.

However, since calcium contained in the brine is precipitated at a pH of 12 or higher, an excessive amount of alkali is added to completely remove calcium, and thus there is a problem that a lot of cost is required, and magnesium hydroxide formed by the addition of sodium hydroxide exhibits disadvantages such as slow sedimentation rate and difficult separation by filtration due to the formation of fine particles having a surface charge. In addition, a precipitation recovery process in which impurities are purified in the form of lithium phosphate or in the form of lithium carbonate after concentration has a disadvantage in that the lithium recovery rate decreases in low concentration due to poor solubility and water-soluble lithium compound.

Therefore, there is a need for research on efficiently producing lithium raw materials from brine at a low concentration containing salts such as magnesium, calcium, boron, sodium, potassium, and sulfuric acid.

DISCLOSURE

Technical Problem

The present invention has been derived to solve the problems, and an object of the present invention is to provide a method for recovering lithium from brine capable of extracting lithium from brine in the form of lithium sulfate by efficiently separating and removing impurities such as magnesium and calcium.

The objects to be solved by the present invention are not limited to the aforementioned object(s), and other object(s), which are not mentioned above, will be apparent to those skilled in the art from the following description.

Technical Solution

An aspect of the present invention provides a method for recovering lithium from brine, comprising: (a) an impurity removal step of adding a carbonate supply source to brine including lithium, magnesium and calcium to precipitate and remove magnesium and calcium impurities; (b) a pH adjusting step of adding an acid to the brine from which the impurities have been removed, to adjust the pH of the brine; (c) a lithium-aluminum compound recovery step of adding an aluminum supply source to the pH-adjusted brine to recover a lithium-aluminum compound; (d) a lithium sulfate and aluminum oxide formation step of adding the lithium-aluminum compound to a sulfur supply source and calcining same to form lithium sulfate and aluminum oxide; and (e) a lithium sulfate solution yield step of selectively dissolving lithium sulfate from among the formed lithium sulfate and aluminum oxide to yield a lithium sulfate solution.

In the impurity removal step, the carbonate supply source may be at least one water-soluble carbonate supply source selected from the group consisting of soda ash ($Na_2CO_3$), sodium hydrogen carbonate ($NaHCO_3$), potassium carbonate ($K_2CO_3$), potassium hydrogen carbonate ($KHCO_3$), and carbon-oxygen compounds ($CO_2$, $CO$).

The impurity removal step may be a step of adding the carbonate supply source to the brine and stirring for 0.1 to 36 hours to precipitate magnesium and calcium and then removing the magnesium and calcium.

The carbonate supply source may be added to the brine so that a molar ratio of carbon:magnesium+calcium is 1:1 to 3:1.

In the pH adjusting step, the acid may be at least one strong acid selected from the group consisting of hydrochloric acid, sulfuric acid and nitric acid.

The pH adjusting step may be a step of adjusting the pH of the brine to pH 6 to 8 by adding the acid to the brine from which the impurities have been removed.

In the lithium-aluminum compound recovery step, the aluminum supply source may include one selected from the group consisting of sodium aluminate ($NaAlO_2$), aluminum metal (Al), aluminum hydroxide ($Al(OH)_3$), alumina hydrate (AlOOH), aluminum oxide ($Al_2O_3$), sodium aluminate hydrate ($NaAl(OH)_4$), potassium aluminate ($KAlO_2$), potassium aluminate hydrate ($KAl(OH)_4$), sodium aluminum sulfate ($NaAl(SO_4)_2$), potassium aluminum sulfate ($KAl(SO_4)_2$), aluminum sulfate ($Al_2(SO_4)_3$), aluminum sulfate ammonium (($NH_4)Al(SO_4)_2$), aluminum chloride ($AlCl_3$), aluminum nitrate ($Al(NO_3)_3$)), aluminum perchlorate ($Al(ClO_4)_3$), aluminum chlorohydrate ($Al_2(OH)_5Cl$), and combinations thereof.

In the lithium-aluminum compound recovery step, the aluminum supply source may be added to the pH-adjusted brine so that a molar ratio of aluminum:lithium is 1:1 to 5:1.

In the lithium-aluminum compound recovery step, the aluminum supply source may be added to the pH-adjusted brine and stirred for 0.1 to 36 hours.

In the lithium sulfate and aluminum oxide formation step, the sulfur supply source may be at least one solid or liquid sulfur supply source selected from the group consisting of sulfuric acid ($H_2SO_4$), aluminum sulfate ($Al_2(SO_4)_3$), magnesium sulfate ($MgSO_4$), sulfur (S), ammonium sulfate (($NH_4)_2SO_4$), hydrazine sulfate ($N_2H_6SO_4$), hydroxylammonium sulfate (($NH_3OH)_2SO_4$) and nitrosyl sulfuric acid ($NOHSO_4$).

In the lithium sulfate and aluminum oxide formation step, the lithium-aluminum compound may be added to the sulfur supply source so that a molar ratio of sulfur:lithium is 0.2:1 to 2:1.

In the lithium sulfate and aluminum oxide formation step, the lithium-aluminum compound may be added to the sulfur supply source and calcined for 0.1 to 6 hours.

In the lithium sulfate and aluminum oxide formation step, the lithium-aluminum compound may be added to the sulfur supply source and calcined at 400 to 800° C.

The lithium sulfate solution yield step may be a step of adding the prepared lithium sulfate and aluminum oxide to water and selectively dissolving the lithium sulfate to yield a lithium sulfate solution.

In the lithium sulfate solution yield step, the prepared lithium sulfate and aluminum oxide may be added to water and react for 0.1 to 5 hours.

Advantageous Effects

According to the present invention, it is possible to yield lithium sulfate from brine at high purity and high concentration by efficiently separating and removing impurities such as magnesium and calcium included in the brine.

It should be understood that the effects of the present invention are not limited to the effects, but include all effects that can be deduced from the detailed description of the present invention or configurations of the present invention described in appended claims.

DESCRIPTION OF DRAWINGS

FIG. 1 is a process flowchart of a method for recovering lithium from brine according to an embodiment of the present invention.

FIG. 2 is a graph showing changes in concentration and pH of lithium, magnesium and calcium in brine according to an amount of soda ash added to the brine according to an embodiment of the present invention. In FIG. 2, (a) is a graph showing changes in concentration of lithium, magnesium and calcium included in the brine according to an added amount of soda ash, and (b) is a graph showing a change in pH of brine according to an added amount of soda ash.

FIG. 3 is a graph showing changes in concentration and recovery rates of lithium, magnesium and calcium in the pH-adjusted brine according to an added amount of sodium aluminate, which is an aluminum supply source to be added to the pH-adjusted brine according to an embodiment of the present invention. In FIG. 3, (a) is a graph showing changes in concentration of lithium, magnesium and calcium in the pH-adjusted brine according to an added amount of sodium aluminate, and (b) is a graph showing recovery rates of lithium, magnesium and calcium in the pH-adjusted brine according to an added amount of sodium aluminate.

FIG. 4 shows XRD graphs of recovery powder after an impurity removal step, after a lithium-aluminum compound recovery step, after a lithium sulfate and aluminum oxide formation step, and a lithium sulfate solution yield step. In FIG. 4, (a) shows an XRD graph of powder obtained by adding soda ash and then drying a recovered magnesium and calcium compound in the impurity removal step, (b) shows an XRD graph of powder obtained by adding sodium aluminate and then drying a recovered lithium-aluminum compound in the lithium-aluminum compound recovery step, (c) shows an XRD graph of lithium sulfate and aluminum oxide formed by calcining at 750° C. in the lithium sulfate and aluminum oxide formation step, and (d) shows an XRD graph of powder obtained by drying filtered and separated aluminum oxide in the lithium sulfate solution yield step.

BEST MODE FOR THE INVENTION

The present invention provides a method for recovering lithium from brine, comprising: (a) an impurity removal step of adding a carbonate supply source to brine including lithium, magnesium and calcium to precipitate and remove magnesium and calcium impurities; (b) a pH adjusting step of adding an acid to the brine from which the impurities have been removed, to adjust the pH of the brine; (c) a lithium-aluminum compound recovery step of adding an aluminum supply source to the pH-adjusted brine to recover a lithium-aluminum compound; (d) a lithium sulfate and aluminum oxide formation step of adding the lithium-aluminum compound to a sulfur supply source and calcining same to form lithium sulfate and aluminum oxide; and (e) a lithium sulfate solution yield step of selectively dissolving lithium sulfate from among the formed lithium sulfate and aluminum oxide to yield a lithium sulfate solution.

Modes for the Invention

Hereinafter, preferred embodiments of the present disclosure will be described in detail with reference to the accompanying drawings.

Advantages and features of the present disclosure, and methods for accomplishing the same will be more clearly understood from exemplary embodiments to be described below in detail with reference to the accompanying drawings.

However, the present disclosure is not limited to the following exemplary embodiments but may be implemented in various different forms. The exemplary embodiments are provided only to make description of the present disclosure complete and to fully provide the scope of the present disclosure to a person having ordinary skill in the art to which the present disclosure pertains with the category of the invention, and the present disclosure will be defined by the appended claims.

In the following description of the present disclosure, a detailed description of known arts related thereto will be omitted when it is determined to make the subject matter of the present disclosure rather unclear.

FIG. 1 is a process flowchart of a method for recovering lithium from brine according to an embodiment of the present invention.

Referring to FIG. 1, the method for recovering lithium from brine according to an embodiment of the present invention includes (a) an impurity removal step of adding a carbonate supply source to brine including lithium, magnesium and calcium to precipitate and remove magnesium and calcium impurities; (b) a pH adjusting step of adding an acid to the brine from which the impurities have been removed, to adjust the pH of the brine; (c) a lithium-aluminum compound recovery step of adding an aluminum supply source to the pH-adjusted brine to recover a lithium-aluminum compound; (d) a lithium sulfate and aluminum oxide formation step of adding the lithium-aluminum compound to a sulfur supply source and calcining same to form lithium sulfate and aluminum oxide; and (e) a lithium sulfate solution yield step of selectively dissolving lithium sulfate from among the formed lithium sulfate and aluminum oxide to yield a lithium sulfate solution.

First, in the method for recovering lithium from brine according to an embodiment of the present invention, a carbonate supply source is added to brine including lithium, magnesium and calcium to precipitate and remove magnesium and calcium impurities (S100).

S100 may be a step of adding at least one water-soluble carbonate supply source selected from the group consisting of soda ash ($Na_2CO_3$), sodium hydrogen carbonate ($NaHCO_3$), potassium carbonate ($K_2CO_3$), potassium hydrogen carbonate ($KHCO_3$), and carbon-oxygen compounds ($CO_2$, $CO$) to the brine including lithium, magnesium and calcium impurities to precipitate the magnesium and calcium impurities included in the brine and then filter and separate the impurities and removing the separated impurities.

The components included in the brine include lithium ($Li^+$), sodium ($Na^+$), potassium ($K^+$), calcium ($Ca^{2+}$), magnesium ($Mg^{2+}$), boron (Bk), sulfuric acid ($SO_4^{2-}$), chlorine ($Cl^-$), and the like and all components except lithium are expressed as impurities.

Even among the impurities, the calcium ($Ca^{2+}$) and magnesium ($Mg^{2+}$) need to be removed first because the calcium ($Ca^{2+}$) and magnesium ($Mg^{2+}$) are co-precipitated with lithium in the lithium precipitation recovery step due to high reactivity with an aluminum supply source and are difficult to be removed due to low solubility even by hot-water washing.

The calcium ($Ca^2$) and magnesium ($Mg^2$) may be precipitated and removed into hydroxides such as $Ca(OH)_2$ and $Mg(OH)_2$ and carbonates and sulfates such as $CaCO_3$, $Ca(HCO_3)_2$, $MgCO_3$, $Mg(HCO_3)_2$, etc. by adding the water-soluble carbonate supply source to the brine.

Specifically, the calcium ($Ca^2$) and magnesium ($Mg^2$) may be removed by adding the water-soluble carbonate supply source to the brine so that a molar ratio of carbon:magnesium+calcium is 1:1 to 3:1, specifically 1.5:1 to 2.5:1 by considering the concentration of magnesium and calcium included in the brine and stirring for 0.1 to 36 hours, more specifically 1 to 24 hours to precipitate magnesium and calcium and filter and separate the magnesium and calcium. In this case, the pH of a filtrate from which the magnesium and calcium are filtered and separated may be pH 9 to 11.

When the water-soluble carbonate supply source is added to the brine so that a molar ratio of carbon:magnesium+calcium is 1:1 to 3:1, specifically 1.5:1 to 2.5:1, the concentrations of magnesium (<250 mg/L) and calcium (<50 mg/L) are reduced and the precipitated impurities may be easily separated.

In addition, when the water-soluble carbonate supply source is added to the brine and stirred for 0.1 to 36 hours, more specifically 1 to 24 hours, the concentrations of magnesium (<250 mg/L) and calcium (<50 mg/L) are reduced and the precipitated impurities may be easily separated.

Next, the pH of the brine is adjusted by adding an acid to the brine from which the impurities have been removed (S200).

S200 may be a step of adjusting the pH of the filtrate by adding the acid to the brine from which the impurities have been removed, specifically the filtrate from which the magnesium and calcium have been removed.

In the pH adjusting step, the acid may be at least one strong acid selected from the group consisting of hydrochloric acid, sulfuric acid and nitric acid.

That is, in the present invention, the pH of the brine may be adjusted to pH 6 to 8 by adding the acid to the brine from which the impurities have been removed, and the pH of the brine from which the impurities have been removed is adjusted to pH 6 to 8 to increase the lithium recovery rate in the lithium-aluminum compound recovery step.

Next, the lithium-aluminum compound is recovered by adding the aluminum supply source to the pH-adjusted brine (S300).

S300 may be a step of adding the aluminum supply source to the pH-adjusted brine prepared in S200 to precipitate the lithium-aluminum compound and then filtering and separating the precipitated lithium-aluminum compound to recover and dry the lithium-aluminum compound.

The lithium-aluminum compound may be recovered to precipitate and recover lithium in the brine.

In the lithium-aluminum compound recovery step, the aluminum supply source may include one selected from the group consisting of sodium aluminate ($NaAlO_2$), aluminum metal (Al), aluminum hydroxide ($Al(OH)_3$), alumina hydrate (AlOOH), aluminum oxide ($Al_2O_3$), sodium aluminate hydrate ($NaAl(OH)_4$), potassium aluminate ($KAlO_2$), potassium aluminate hydrate ($KAl(OH)_4$), sodium aluminum sulfate ($NaAl(SO_4)_2$), potassium aluminum sulfate ($KAl(SO_4)_2$), aluminum sulfate ($Al_2(SO_4)_3$), aluminum sulfate ammonium (($NH_4$)$Al(SO_4)_2$), aluminum chloride ($AlCl_3$), aluminum nitrate ($Al(NO_3)_3$), aluminum perchlorate ($Al(ClO_4)_3$), aluminum chlorohydrate ($Al_2(OH)_5Cl$), and combinations thereof. Specifically, as the aluminum supply source, sodium aluminate ($NaAlO_2$) may be used in terms of a fast lithium-aluminum compound formation rate and less influence of impurities.

In the lithium-aluminum compound recovery step, the aluminum supply source may be added to the brine adjusted to pH 6 to 8 from which the impurities have been removed, so that the molar ratio of aluminum:lithium is 1:1 to 5:1, specifically 2.5:1 to 3.5:1 in the added amount of the aluminum supply source.

When the aluminum supply source is added to the brine from which the impurities have been removed so that the molar ratio of aluminum:lithium is 1:1 to 5:1, the lithium recovery rate may increase in the lithium-aluminum compound recovery step.

The lithium-aluminum compound recovery step may be a step of precipitating the lithium-aluminum compound by adding the aluminum supply source to the pH-adjusted brine and stirring for 0.1 to 36 hours, specifically 1 to 24 hours.

When the aluminum supply source is added to the pH-adjusted brine and stirred for 0.1 to 36 hours, specifically 1 to 24 hours, the lithium recovery rate may increase in the lithium-aluminum compound recovery step.

Next, the lithium-aluminum compound is added to a sulfur supply source and calcined to form lithium sulfate and aluminum oxide (S400).

S400 may be a step of adding and calcining the lithium-aluminum compound recovered in S300 to the sulfur supply source to form the lithium sulfate and aluminum oxide.

In S400, the sulfur supply source may be at least one solid or liquid sulfur supply source selected from the group consisting of sulfuric acid ($H_2SO_4$), aluminum sulfate ($Al_2(SO_4)_3$), magnesium sulfate ($MgSO_4$), sulfur (S), ammonium sulfate (($NH_4)_2SO_4$), hydrazine sulfate ($N_2H_6SO_4$), hydroxylammonium sulfate (($NH_3OH)_2SO_4$) and nitrosyl sulfuric acid ($NOHSO_4$).

In S400 of the present invention, when the sulfur supply source is used, the lithium sulfate and aluminum oxide may be effectively formed through the calcining process.

In S400, the lithium-aluminum compound may be added to the sulfur supply source so that the molar ratio of sulfur:lithium is 0.2:1 to 2:1, specifically 0.5:1 to 1:1.

When the lithium-aluminum compound is added to the sulfur supply source so that the molar ratio of sulfur:lithium is 0.2:1 to 2:1, the conversion rate from the lithium-aluminum compound to the lithium sulfate and aluminum oxide may increase.

In S400, the lithium-aluminum compound may be added to the sulfur supply source and react for 0.1 to 6 hours, specifically 0.5 to 2 hours.

When the lithium-aluminum compound is added to the sulfur supply source and reacts for 0.1 to 6 hours, specifically 0.5 to 2 hours, the conversion rate from the lithium-aluminum compound to the lithium sulfate and aluminum oxide may increase.

When preparing the lithium sulfate and aluminum oxide in S400, the reaction temperature may be 400 to 800° C., specifically 500 to 750° C.

When the calcining temperature is 400 to 800° C., specifically 500 to 750° C., the conversion rate from the lithium-aluminum compound to the lithium sulfate and aluminum oxide may increase.

Next, lithium sulfate is selectively dissolved in the formed lithium sulfate and aluminum oxide to yield a lithium sulfate solution (S500).

S500 may be a step of adding the lithium sulfate and aluminum oxide formed in S400 to water to selectively dissolve the lithium sulfate and then filtering and separating the lithium sulfate to yield a lithium sulfate solution. At this time, the filtered and separated filtrate may be a lithium sulfate solution.

In S500, the lithium sulfate and aluminum oxide may be added to water and stirred for 0.1 to 5 hours, specifically 0.5 to 2 hours.

When the lithium sulfate and aluminum oxide is added to water and stirred for 0.1 to 5 hours, specifically 0.5 to 2 hours, the lithium sulfate may be effectively dissolved.

Hereinafter, preferred Examples are presented to help the understanding of the present invention, but the following Examples are only illustrative of the present invention and the scope of the present invention is not limited to the following Examples.

EXAMPLES

Example 1

1) Brine having concentrations of lithium ($Li^+$) 364 mg/L, sodium ($Na^+$) 8,540 mg/L, potassium ($K^+$) 4,340 mg/L, magnesium ($Mg^{2+}$) 8,100 mg/L, calcium ($Ca^{2+}$) 73.6 mg/L, chlorine ($Cl^-$) 39,600 mg/L, sulfuric acid ($504^{2-}$) 7,580 mg/L, and boron ($B^+$) 344 mg/L was prepared.

0 g, 11.1 g, 30.4 g, 50.3 g, 70.8 g, and 100.5 g of soda ash ($Na_2CO_3$) powder were added to 1 L of the brine, respectively, and stirred for 24 hours. 70.8 g of soda ash ($Na_2CO_3$) powder was added to 1 L of the brine and stirred for 24 hours to filter and separate the precipitated magnesium and calcium. 0.1 M HCl 0.25 L was added to 1 L of the filtrate from which magnesium and calcium were filtered and separated to adjust the pH to 7.56. 0 g, 3.0 g, 5.8 g, 8.5 g, 15.5 g, and 26.2 g of $NaAlO_2$ were added to 1 L of the filtrate adjusted to pH 7.56 and stirred for 24 hours. 15.5 g of $NalO_2$ was added to 1 L of the filtrate adjusted to pH 7.56, and a lithium-aluminum compound as a precipitate was filtered and separated and then recovered.

The recovered lithium-aluminum compound was dried at 60° C. 3 g of the dried lithium-aluminum compound was added to 15 mL of a 5 M sulfuric acid ($H_2SO_4$) solution and then heat-treated at 300° C. for 2 hours to prepare powder, and then the heat-treated powder was calcined at 750° C. for 2 hours to prepare powder in which lithium sulfate and aluminum oxide phases were mixed. The lithium sulfate and aluminum oxide powder was added to water at a concentration of 200 g/L, stirred for 2 hours, and filtered and separated to yield a lithium sulfate solution.

2) 10 g of the lithium-aluminum compound recovered and dried in the same manner as in 1) and 3.19 g of ammonium sulfate (($NH_4)_2SO_4$) were added to 50 mL of distilled water, stirred for 2 hours, and then dried at 60° C. to prepare a powder form. The prepared powder was calcined at 300, 400, and 500° C. for 2 hours to prepare powder in which the lithium sulfate and aluminum oxide phases were mixed. The lithium sulfate and aluminum oxide powder was added to water at a concentration of 100 g/L, stirred for 2 hours, and filtered and separated to yield a lithium sulfate solution.

Example 2

36 g of soda ash ($Na_2CO_3$) powder was added to 1 L of brine having concentrations of lithium ($Li^+$) 364 mg/L, sodium ($Na^+$) 8,540 mg/L, potassium ($K^+$) 4,340 mg/L, magnesium ($Mg^{2+}$) 8,100 mg/L, calcium ($Ca^{2+}$) 73.6 mg/L, chlorine ($Cl^-$) 39,600 mg/L, sulfuric acid ($SO_4^{2-}$) 7,580 mg/L, and boron ($B^+$) 344 mg/L, stirred for 24 hours, and filtered and separated. 13 g of $NaAlO_2$ based on 1 L of the filtrate was added and stirred for 24 hours. After the addition of soda ash, a 1 M HCl solution was added to the filtrate to adjust the pH to 7.56, and then 13 g of $NaAlO_2$ per 1 L was added and stirred for 24 hours.

EXPERIMENTAL EXAMPLES

Experimental Example 1

In Example 1, the concentrations of lithium, magnesium and calcium according to an added amount of soda ash of the brine were measured using ICP-OES, and the pH was measured using a pH meter (HORIBA, D-52), and the results thereof were illustrated in FIG. 2.

FIG. 2 is a graph showing changes in concentration and pH of lithium, magnesium and calcium in brine according to an amount of soda ash added to the brine according to an embodiment of the present invention. In FIG. 2, (a) is a graph showing changes in concentration of lithium, magnesium and calcium included in the brine according to an added amount of soda ash, and (b) is a graph showing a change in pH of brine according to an added amount of soda ash.

Referring to FIG. 2, it was confirmed that as the added amount of soda ash increased, the concentrations of magnesium and calcium decreased, so that 97.4% of magnesium and 83.7% of calcium were precipitated under a condition of S/L 70.8 g/L, and the pH value increased from 6.3 to 9.89, and at this time, the loss of lithium was low as 8.4% or less.

Experimental Example 2

The concentration of pH-adjusted brine according to an added amount of sodium aluminate in Example 1 was measured using ICP-OES, and the recovery rate was calculated using Equation 1 below, and the results were illustrated in FIG. 3.

$$\text{Recovery }\% = \frac{(Co - Cx)}{Co} \cdot 100 \qquad \text{[Equation 1]}$$

In Equation 1, Co means an initial concentration, and Cx means a concentration after precipitation.

FIG. 3 is a graph showing changes in concentration and recovery rates of lithium, magnesium and calcium in the pH-adjusted brine according to an added amount of sodium aluminate, which is an aluminum supply source to be added to the pH-adjusted brine according to an embodiment of the present invention. In FIG. 3, (a) is a graph showing changes in concentration of lithium, magnesium and calcium in the pH-adjusted brine according to an added amount of sodium aluminate, and (b) is a graph showing recovery rates of lithium, magnesium and calcium in the pH-adjusted brine according to an added amount of sodium aluminate.

Referring to FIG. 3, a change in concentration and a change in recovery rate according to an amount of sodium aluminate added to a lithium solution having pH 7.56 were illustrated, and it was confirmed that 97.3% of lithium was precipitated and recovered under a condition of S/L 15.5 g/L, and it was confirmed that magnesium and calcium remaining in the lithium solution after precipitating and removing the magnesium and calcium impurities were also precipitated by 99.8% and 100%, respectively.

Experimental Example 3

Recovered powder after adding soda ash prepared in Example 1, recovered powder after adding sodium aluminate, powder after adding and calcining a lithium-aluminum compound to sulfuric acid, and recovered powder after a lithium sulfate solution yield step were measured by an X-ray diffraction analyzer (smartlab, Rigaku), and the results were illustrated in FIG. 4.

FIG. 4 shows XRD graphs of recovery powder after an impurity removal step, after a lithium-aluminum compound recovery step, after a lithium sulfate and aluminum oxide formation step, and a lithium sulfate solution yield step. In FIG. 4, (a) shows an XRD graph of powder obtained by adding soda ash and then drying a recovered magnesium and calcium compound in the impurity removal step, (b) shows an XRD graph of powder obtained by adding sodium aluminate and then drying a recovered lithium-aluminum compound in the lithium-aluminum compound recovery step, (c) shows an XRD graph of lithium sulfate and aluminum oxide formed by calcining at 750° C. in the lithium sulfate and aluminum oxide formation step, and (d) shows an XRD graph of powder obtained by drying filtered and separated aluminum oxide in the lithium sulfate solution yield step.

Referring to (d) in FIG. 4, it was confirmed that the properties corresponding to lithium sulfate disappeared when the powder obtained by selectively dissolving lithium sulfate and then drying the filtered and separated aluminum oxide was measured by XRD.

In addition, in the case of using sulfuric acid ($H_2SO_4$) as the sulfur supply source, the concentration of lithium in the finally yielded lithium sulfate solution was 2,788.84 mg/L (750° C.), and in the case of using ammonium sulfate (($NH_4$)$_2SO_4$) as the sulfur supply source, the concentration of lithium in the finally yielded lithium sulfate solution was 2,778.99 mg/L (300° C.), 3,111.57 mg/L (400° C.), and 3,639.23 mg/L (500° C.). It was confirmed that a high-concentration lithium solution of 2000 mg/L or more could be prepared from brine at a low concentration of about 300 mg/L including magnesium and calcium used for the first time.

In addition, it was confirmed that potassium, boron, and added aluminum were not present in the lithium sulfate solution, and magnesium (820.15 mg/L) and calcium (105.81 mg/L) were present in small amounts.

Experimental Example 4

The lithium concentration in the brine of Example 2 was 314.41 mg/L, and after the addition of soda ash powder, the lithium concentration was 313.18 mg/L and lithium was lost by 0.4%. When the pH of the filtrate was 8.85 and 13 g of $NaAlO_2$ based on 1 L of the filtrate was added and stirred for 24 hours, the lithium concentration was reduced to 96.60 mg/L, and 69% of lithium was recovered. After a 1 M HCl solution was added to the filtrate after the addition of soda ash to adjust the pH to 7.56, the concentration of lithium was 298.15 mg/L, and after 13 g of $NaAlO_2$ based on 1 L of the pH-adjusted solution was added and stirred for 24 hours, the concentration of lithium was reduced to 44.77 mg/L, and 85% of lithium was recovered. It was confirmed that the recovery rate of lithium increased after pH adjustment of the lithium solution from which the impurities were removed.

As described above, specific embodiments of the method for recovering lithium from brine according to the present invention have been described, but it is obvious that various modifications can be made without departing from the scope of the present invention.

Therefore, the scope of the present invention should not be limited to the exemplary embodiments and should be defined by the appended claims and equivalents to the appended claims.

In other words, the exemplary embodiments described above are illustrative in all aspects and should be understood as not being restrictive, and the scope of the present invention is represented by appended claims to be described below rather than the detailed description, and it is to be interpreted that the meaning and scope of the appended claims and all changed or modified forms derived from the equivalents thereof are included within the scope of the present invention.

INDUSTRIAL APPLICABILITY

According to the present invention, it is possible to yield lithium sulfate from brine at high purity and high concentration by efficiently separating and removing impurities such as magnesium and calcium included in the brine.

The invention claimed is:

1. A method for recovering lithium from brine, comprising:
    (a) an impurity removal step of adding a carbonate supply source to brine including lithium, magnesium and calcium to precipitate and remove magnesium and calcium impurities;
    (b) a pH adjusting step of adding an acid to the brine from which the impurities have been removed, to adjust the pH of the brine;
    (c) a lithium-aluminum compound recovery step of adding an aluminum supply source to the pH-adjusted brine to recover a lithium-aluminum compound;
    (d) a lithium sulfate and aluminum oxide formation step of adding the lithium-aluminum compound to a sulfur supply source and calcining same to form lithium sulfate and aluminum oxide; and
    (e) a lithium sulfate solution yield step of selectively dissolving lithium sulfate from among the formed lithium sulfate and aluminum oxide to yield a lithium sulfate solution.

2. The method for recovering lithium from brine of claim 1, wherein in the impurity removal step, the carbonate supply source is at least one water-soluble carbonate supply source selected from the group consisting of soda ash ($Na_2CO_3$), sodium hydrogen carbonate ($NaHCO_3$), potassium carbonate ($K_2CO_3$), potassium hydrogen carbonate ($KHCO_3$), and carbon-oxygen compounds ($CO_2$, $CO$).

3. The method for recovering lithium from brine of claim 1, wherein the impurity removal step is a step of adding the carbonate supply source to the brine and stirring for 0.1 to 36 hours to precipitate magnesium and calcium and then removing the magnesium and calcium.

4. The method for recovering lithium from brine of claim 1, wherein the carbonate supply source is added to the brine so that a molar ratio of carbon:magnesium+calcium is 1:1 to 3:1.

5. The method for recovering lithium from brine of claim 1, wherein in the pH adjusting step, the acid is at least one strong acid selected from the group consisting of hydrochloric acid, sulfuric acid and nitric acid.

6. The method for recovering lithium from brine of claim 1, wherein the pH adjusting step is a step of adjusting the pH of the brine to pH 6 to 8 by adding the acid to the brine from which the impurities have been removed.

7. The method for recovering lithium from brine of claim 1, wherein in the lithium-aluminum compound recovery step, the aluminum supply source includes one selected from the group consisting of sodium aluminate ($NaAlO_2$), aluminum metal (Al), aluminum hydroxide ($Al(OH)_3$), alumina hydrate (AlOOH), aluminum oxide ($Al_2O_3$), sodium aluminate hydrate ($NaAl(OH)_4$), potassium aluminate ($KAlO_2$), potassium aluminate hydrate ($KAl(OH)_4$), sodium aluminum sulfate ($NaAl(SO_4)_2$), potassium aluminum sulfate ($KAl(SO_4)_2$), aluminum sulfate ($Al_2(SO_4)_3$), aluminum sulfate ammonium ($(NH_4)Al(SO_4)_2$), aluminum chloride ($AlCl_3$), aluminum nitrate ($Al(NO_3)_3$), aluminum perchlorate ($Al(ClO_4)_3$), aluminum chlorohydrate ($Al_2(OH)_5Cl$), and combinations thereof.

8. The method for recovering lithium from brine of claim 1, wherein in the lithium-aluminum compound recovery step, the aluminum supply source is added to the pH-adjusted brine so that a molar ratio of aluminum:lithium is 1:1 to 5:1.

9. The method for recovering lithium from brine of claim 1, wherein in the lithium-aluminum compound recovery step, the aluminum supply source is added to the pH-adjusted brine and stirred for 0.1 to 36 hours.

10. The method for recovering lithium from brine of claim 1, wherein in the lithium sulfate and aluminum oxide formation step, the sulfur supply source is at least one solid or liquid sulfur supply source selected from the group consisting of sulfuric acid ($H_2SO_4$), aluminum sulfate ($Al_2(SO_4)_3$), magnesium sulfate ($MgSO_4$), sulfur (S), ammonium sulfate ($(NH_4)_2SO_4$), hydrazine sulfate ($N_2H_6SO_4$), hydroxylammonium sulfate ($(NH_3OH)_2SO_4$) and nitrosyl sulfuric acid ($NOHSO_4$).

11. The method for recovering lithium from brine of claim 1, wherein in the lithium sulfate and aluminum oxide formation step, the lithium-aluminum compound is added to the sulfur supply source so that a molar ratio of sulfur:lithium is 0.2:1 to 2:1.

12. The method for recovering lithium from brine of claim 1, wherein in the lithium sulfate and aluminum oxide formation step, the lithium-aluminum compound is added to the sulfur supply source and calcined for 0.1 to 6 hours.

13. The method for recovering lithium from brine of claim 1, wherein in the lithium sulfate and aluminum oxide formation step, the lithium-aluminum compound is added to the sulfur supply source and calcined at 400 to 800° C.

14. The method for recovering lithium from brine of claim 1, wherein the lithium sulfate solution yield step is a step of adding the prepared lithium sulfate and aluminum oxide to water and selectively dissolving the lithium sulfate to yield a lithium sulfate solution.

15. The method for recovering lithium from brine of claim 14, wherein in the lithium sulfate solution yield step, the prepared lithium sulfate and aluminum oxide is added to water and reacts for 0.1 to 5 hours.

* * * * *